United States Patent
Yamanashi et al.

(10) Patent No.: US 10,979,442 B2
(45) Date of Patent: Apr. 13, 2021

(54) ANOMALY DETECTION DATA IDENTIFICATION DEVICE, ANOMALY IDENTIFICATION SYSTEM, AND STORAGE MEDIUM THAT STORES ANOMALY IDENTIFICATION PROGRAM

(71) Applicant: TOYOTA JIDOSHA KABUSHIKI KAISHA, Toyota (JP)

(72) Inventors: Takahiro Yamanashi, Toyota (JP); Jun Tahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 16/242,263

(22) Filed: Jan. 8, 2019

(65) Prior Publication Data
US 2019/0268360 A1  Aug. 29, 2019

(30) Foreign Application Priority Data

Feb. 23, 2018 (JP) .............................. JP2018-030545

(51) Int. Cl.
| | | |
|---|---|---|
| H04L 29/06 | (2006.01) | |
| H04L 29/08 | (2006.01) | |
| G08B 25/10 | (2006.01) | |
| G07C 5/00 | (2006.01) | |

(52) U.S. Cl.
CPC .......... H04L 63/1425 (2013.01); G07C 5/008 (2013.01); G08B 25/10 (2013.01); H04L 67/12 (2013.01)

(58) Field of Classification Search
None
See application file for complete search history.

(56) References Cited

U.S. PATENT DOCUMENTS

| | | | | |
|---|---|---|---|---|
| 2006/0097854 A1* | 5/2006 | Basu | ...................... | G07C 5/006 340/425.5 |
| 2013/0030641 A1* | 1/2013 | Olsen, III | ................ | G07C 5/02 701/31.6 |
| 2017/0372534 A1* | 12/2017 | Steketee | ................ | G07C 5/008 |

FOREIGN PATENT DOCUMENTS

WO        2009/038028 A1      3/2009

* cited by examiner

*Primary Examiner* — William J. Goodchild
(74) *Attorney, Agent, or Firm* — Oliff PLC (57) ABSTRACT

A piece of anomaly detection data that is the subject of determination is referred to as target data. The position of a vehicle when an anomaly occurred is grasped based on the target data. The number of pieces of the anomaly detection data is defined as the number of pieces of the anomaly detection data output within a predetermined area from the position of the vehicle when the anomaly occurred that is grasped based on the target data among the anomaly detection data stored in the memory. It is determined that the possibility that the target data is generated due to repair of the vehicle is higher when the number of pieces of the anomaly detection data is greater than or equal to a predetermined number than when the number of pieces of the anomaly detection data is less than the predetermined number.

11 Claims, 7 Drawing Sheets

| Vehicle ID | |
|---|---|
| Type of Anomaly | |
| Position PD | |
| Day of Week | |
| Time of Day | |
| Vehicle Speed SPD | |

|  | Example 1 | Example 2 | Example 3 |
|---|---|---|---|
| Vehicle Speed | High | High | High |
| Day of Week | High | High | Medium |
| Time | High | Low | Low |
| Same Vehicle | High | Low | Low |
| Determination Result | High | Low | Low |

Fig.12

ANOMALY DETECTION DATA IDENTIFICATION DEVICE, ANOMALY IDENTIFICATION SYSTEM, AND STORAGE MEDIUM THAT STORES ANOMALY IDENTIFICATION PROGRAM

BACKGROUND

The present disclosure relates to an anomaly detection data identification device and an anomaly identification system, and to a memory medium that stores an anomaly identification program. When an anomaly is detected, an anomaly notification device mounted on a vehicle outputs anomaly detection data including the position of the vehicle and information indicating the occurrence of the anomaly. The anomaly detection data identification device receives the anomaly detection data from the vehicle-mounted anomaly notification device.

For example, an anomaly detector disclosed in International Publication No. 2009/38028 transmits anomaly information to a server at an information center when an anomaly in a vehicle is detected by a vehicle-mounted device. In particular, if the vehicle is located at a service shop, the anomaly detector prohibits transmission of the anomaly information.

SUMMARY

Examples of the present disclosure will now be described.

Example 1

An anomaly detection data identification device configured to receive anomaly detection data from a vehicle-mounted anomaly notification device is provided. The vehicle-mounted anomaly notification device is configured to, if an anomaly is detected, output anomaly detection data including a position of a vehicle and information indicating an occurrence of the anomaly. The anomaly detection data identification device includes a processing circuit and a memory. The processing circuit is configured to execute: a receiving process of receiving the anomaly detection data; a storing process of storing the received anomaly detection data in the memory; and a determination process of determining whether a possibility that the received anomaly detection data is generated due to repair of the vehicle is high or low. A piece of the anomaly detection data that is a subject of determination is referred to as target data. The position of the vehicle when the anomaly occurred is grasped based on the target data. The number of pieces of the anomaly detection data is defined as the number of pieces of the anomaly detection data output within a predetermined area from the position of the vehicle when the anomaly occurred grasped based on the target data among the anomaly detection data stored in the memory. The determination process determines that the possibility that the target data is generated due to repair of the vehicle is higher when the number of pieces of the anomaly detection data is greater than or equal to a predetermined number than when the number of pieces of the anomaly detection data is less than the predetermined number.

If the number of occurrences of the anomalies within the predetermined area from the position where the anomaly occurred is great, there are a possibility that a repair shop exists in the predetermined area and a possibility that the anomaly occurred due to repair. With the above-described configuration, it is determined that the possibility that the anomaly detection data is generated due to repair is higher when the number of pieces of the anomaly detection data in the predetermined area is greater than or equal to the predetermined number than when the number of pieces of the anomaly detection data in the predetermined area is less than the predetermined number. This inhibits an erroneous determination that the anomaly is the one that should be noticed.

In the above publication, to avoid erroneously determining the anomaly information generated during repair as the anomaly information that should be noticed at the information center, the vehicle device needs to determine that the vehicle is at a service shop. Even if a service shop is registered in the vehicle device, and the vehicle device includes a function to determine whether it is the registered service shop, if the anomaly information is transmitted during repair at, for example, a repair shop that has not been registered, it may possibly be determined erroneously that it is the anomaly information that should be noticed at the information center. The above-described configuration inhibits such an error.

Example 2

In the anomaly detection data identification device of Example 1, the anomaly detection data includes information about time at which an anomaly occurred. The determination process includes a specifying process of specifying a repair site candidate based on the target data, a time-of-day-based aggregating process, and a time-of-day-based determination process. The time-of-day-based aggregating process aggregates the number of occurrences of the anomaly by time periods based on the anomaly detection data output within a specified area from the repair site candidate among the anomaly detection data stored in the memory. The number of occurrences of the anomaly is defined as the number of occurrences of the anomaly that corresponds to the time indicated by the target data among the time periods categorized by the time-of-day-based aggregating process. The time-of-day-based determination process determines that the possibility that the target data is generated due to repair of the vehicle is higher when the number of occurrences of the anomaly is great than when the number of occurrences of the anomaly is small.

Vehicles are repaired depending on, for example, working hours of workers at the repair shop. That is, when an anomaly occurs due to repair, the number of occurrences of the anomaly tends to increase at a certain time period. For this reason, the above-described configuration includes the time-of-day-based aggregating process and the time-of-day-based determination process. Thus, in the region in which a great number of pieces of the anomaly detection data are output, it is more accurately determined whether the anomaly detection data is actually generated due to repair.

Example 3

In the anomaly detection data identification device of Example 1 or 2, the anomaly detection data includes information about a vehicle speed when the anomaly occurred. The determination process includes a vehicle speed reflection determination process of determining that the possibility that the target data is generated due to repair of the vehicle is higher when the vehicle speed is small than when the vehicle speed is great.

It is considered that the possibility that repair of the vehicle is performed is high when the vehicle speed is low.

For this reason, the above-described configuration includes the vehicle speed reflection determination process. Thus, in the region in which a great number of pieces of the anomaly detection data are output, it is more accurately determined whether the anomaly detection data is actually generated due to repair.

Example 4

In the anomaly detection data identification device of any one of Examples 1 to 3), the anomaly detection data includes information about the day of week on which the anomaly occurred. The determination process includes: a specifying process of specifying a repair site candidate based on the target data; a day-of-week-based aggregating process of aggregating the number of occurrences of the anomaly by day of week based on the anomaly detection data output within a specified area from the repair site candidate among the anomaly detection data stored in the memory; and a day-of-week-based determination process of determining that the possibility that the target data is generated due to repair of the vehicle is higher when the number of occurrences of the anomaly is great than when the number of occurrences of the anomaly is small on the day corresponding to the day indicated by the target data among the categories of the day in the day-of-week-based aggregating process.

Vehicles are repaired depending on, for example, the working days of the workers at the repair shop. That is, when an anomaly occurs due to repair, there tend to be days on which the number of occurrences of the anomaly is increased. For this reason, the above-described configuration includes a day-of-week-based aggregating process and a day-of-week-based determination process. Thus, in the region in which a great number of pieces of the anomaly detection data are output, it is more accurately determined whether the anomaly detection data is actually generated due to repair.

Example 5

In the anomaly detection data identification device of any one of examples 1 to 4, the anomaly detection data includes information that identifies the vehicle. The determination process includes: a same vehicle data collection process of aggregating the number of occurrences of anomaly of the same vehicle based on the anomaly detection data stored in the memory; and a vehicle-based determination process of determining that the possibility that the anomaly detection data is generated due to repair of the vehicle is higher when the number of occurrences of the anomaly of the same vehicle as the vehicle identified by the target data is great than when the number of occurrences of the anomaly of the same vehicle is small.

There may be a certain number of users who repair or modify the vehicle by themselves. There is a possibility that a great number of pieces of the anomaly detection data are output from the vehicle of such a user. Thus, when the number of occurrences of the anomaly in the same vehicle is great, the above-described configuration determines that the possibility that the vehicle is being repaired is high including a case in which it is actually a modification performed by a user. This inhibits an erroneous determination that it is an anomaly that should be noticed when the target data is actually generated due to a modification or repair.

Example 6

In the anomaly detection data identification device of Example 2 or 4, the specifying process includes: a centroid calculating process of calculating a centroid based on positions included within a predetermined distance from the position of the vehicle identified by the target data among positions of the vehicle identified by the anomaly detection data of the past stored in the memory, the centroid being a mean value of these positions; and a specifying process of specifying the repair site candidate based on the calculated centroid.

In a case in which the accuracy of the position information of the anomaly detection data is low due to, for example, the performance of a GPS, if the repair site candidate is determined based only on the position information included in the anomaly detection data, the accuracy may be undesirably reduced. The above-described configuration determines the repair site candidate by obtaining the centroid of the position of the vehicle indicated by the position information held by each of the pieces of the anomaly detection data generated nearby. This improves the identifying accuracy of the anomaly detection data.

Example 7

In the anomaly detection data identification device of Example 6, the specifying process includes: setting the centroid calculated by the centroid calculating process as an initial value of a first centroid; a second centroid calculating process of calculating a second centroid based on the positions included within the predetermined distance from the first centroid among the positions of the vehicle identified by the anomaly detection data of the past stored in the memory, the second centroid being a mean value of these positions of the vehicle; a first selecting process of selecting the first centroid as the repair site candidate if a distance between the position of the vehicle identified by the target data and the second centroid is greater than a threshold value; and a second selecting process of selecting the second centroid as the repair site candidate if a distance between the position of the vehicle identified by the target data and the second centroid is less than or equal to the threshold value, and a distance between the first centroid and the second centroid is less than or equal to a specified value. If a distance between the first centroid and the second centroid is greater than the specified value, the specifying process substitutes the second centroid for the first centroid and executes the second centroid calculating process.

The above-described configuration includes the second centroid calculating process. Thus, for example, compared with a case in which the centroid calculated by the centroid calculating process is set as the repair site candidate, there is a high reliability of the repair site candidate being the actual repair location.

Example 8

In the anomaly detection data identification device of any one of Examples 1 to 7, the processing circuit is configured to execute an outputting process of outputting, in order to show on a display, data that links information indicating the occurrence of the anomaly based on the anomaly detection data and a determination result of the determination process corresponding to the information.

The data output by the above-described output process includes the information indicating the occurrence of the anomaly and the determination result of whether the possibility that the anomaly detection data is generated due to repair of the vehicle is high or low that is linked to the information. The above-described configuration displays such data as visual information about the display. Thus, the determination of whether the information indicating the occurrence of the anomaly is the information that should be noticed is easily made.

Example 9

An anomaly identification system that includes the anomaly detection data identification device of any one of Examples 1 to 8 and a vehicle-mounted anomaly notification device.

Example 10

An anomaly detection data identification method is provided that performs the various processes described in Examples 1 to 8.

Example 11

A non-transitory computer readable memory medium is provided that stores a program that causes a processing circuit to perform the various processes described in Examples 1 to 8.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DETAILED DESCRIPTION

An anomaly detection data identification device according to an embodiment will now be described with reference to the drawings.

Figure 1:
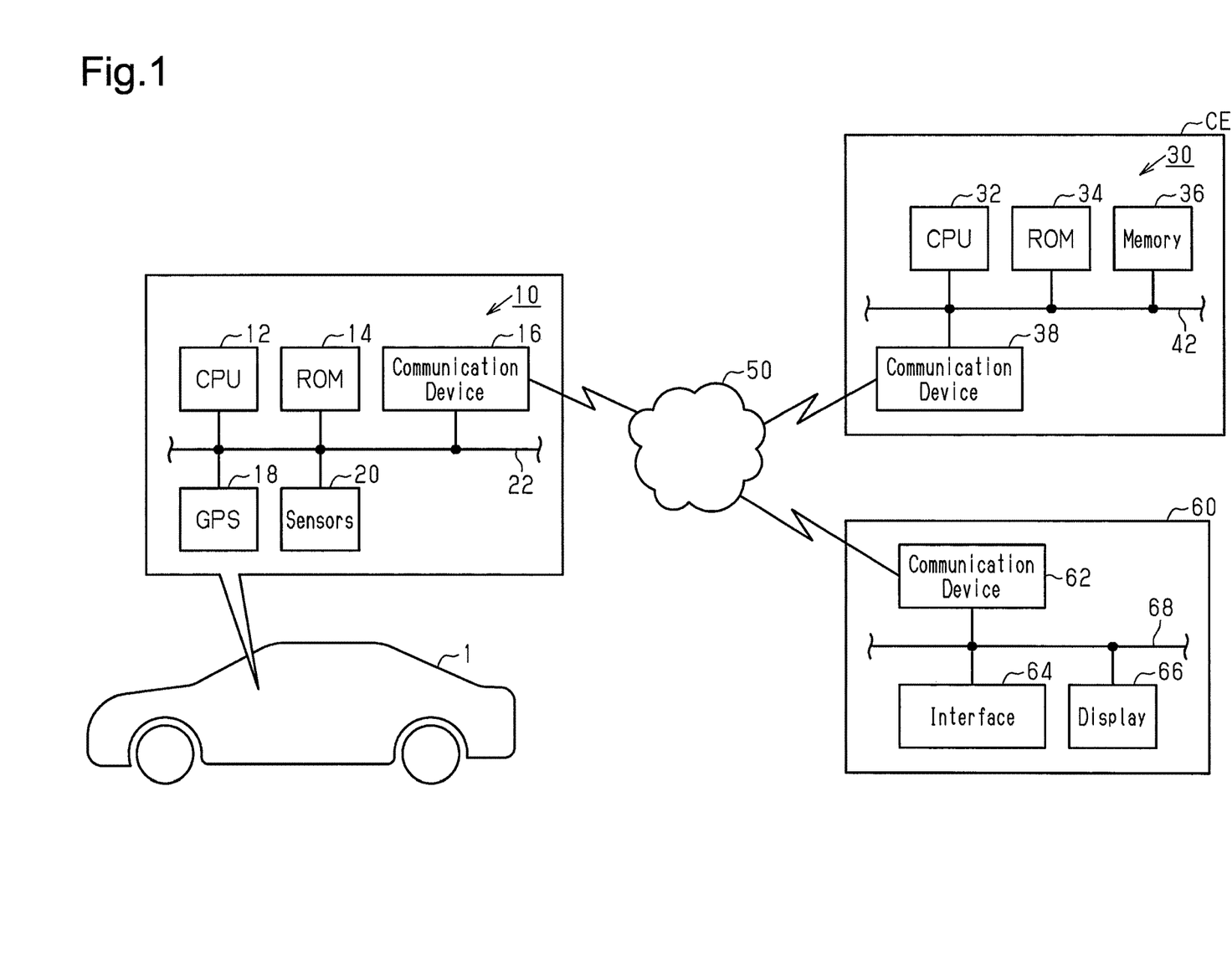
FIG. 1 is a diagram illustrating an anomaly identification system according to one embodiment of the present disclosure.

A vehicle 1 shown in FIG. 1 is equipped with an anomaly notification device 10. The anomaly notification device 10 includes a CPU 12, a ROM 14, a communication device 16, a GPS 18, and sensors 20, which are capable of communicating with each other through a network 22.

Figure 2:
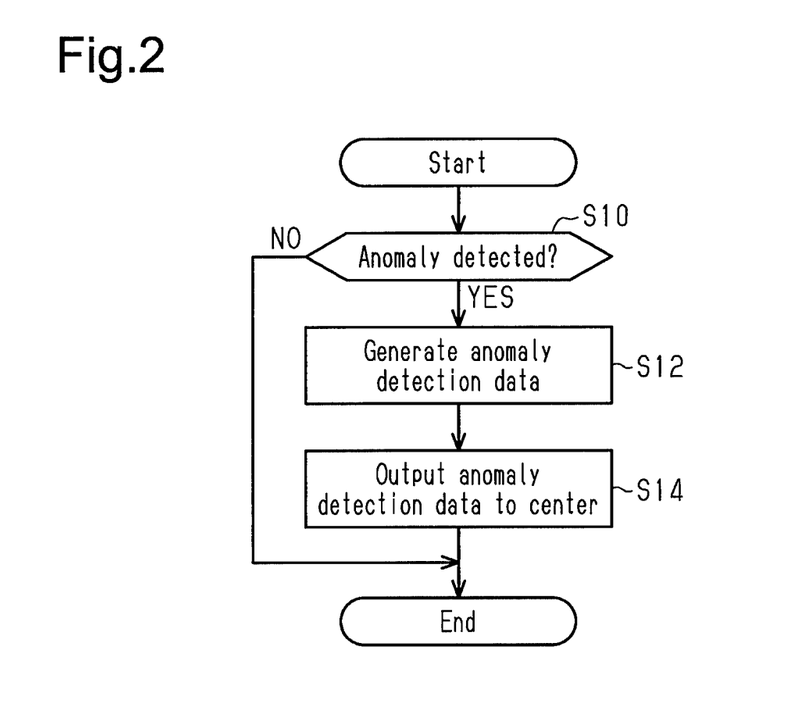
FIG. 2 is a flowchart showing the routine in the vehicle according to the anomaly identification system of FIG. 1.

FIG. 2 shows the routine executed by the anomaly notification device 10. The routine of FIG. 2 is performed by the CPU 12 repeatedly executing a program stored in the ROM 14 in, for example, a predetermined cycle. In the following description, numbers preceded by S represent the step numbers of the processes.

In the series of steps shown in FIG. 2, the CPU 12 first determines whether there is an anomaly in the vehicle based on output values of the sensors 20 (S10). The term anomaly here includes an anomaly that is to be notified to a user of the vehicle when it occurs and an anomaly that is not to be notified to the user. The anomaly that is to be notified to the user refers to an anomaly that requires prompting the user to get the vehicle repaired at a repair shop. The anomaly that is not to be notified to the user is an anomaly that does not require repair, but may provide highly suggestive information for improvements of the product and may be advantageous for developments of the vehicle. More specifically, the anomaly includes, for example, a faulty connection of a connector in an electronic circuit. If it is determined that there is an anomaly, the CPU 12 generates anomaly detection data (S12). The anomaly detection data is referred to as freeze frame data (FFD).

Figure 3:
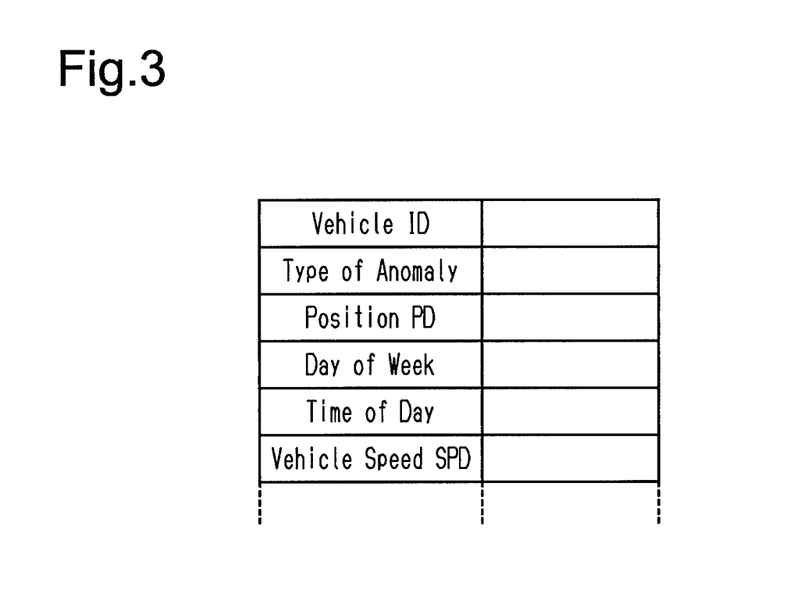
FIG. 3 is a table showing anomaly detection data according to the anomaly identification system of FIG. 1.

FIG. 3 shows the anomaly detection data. As shown in FIG. 3, the anomaly detection data includes a vehicle ID that identifies the vehicle, information about the type of the anomaly, and information about a position PD when the anomaly occurred. The position PD is generated by the CPU 12 based on the output signal of the GPS 18 when the anomaly occurred. The anomaly detection data also includes information about the day of week, the time of day, and the vehicle speed SPD when the anomaly occurred. The day of week, the time of day, and the vehicle speed SPD are detected by the sensors 20. That is, the sensors 20 include a clock and a vehicle speed sensor.

Referring back to FIG. 2, the CPU 12 operates the communication device 16 to output the anomaly detection data to a center CE shown in FIG. 1 through a network 50 (S14). When the process of S14 is completed, or if the decision outcome of the process of S10 is negative, the CPU 12 temporarily suspends the series of steps shown in FIG. 2.

Referring back to FIG. 1, the center CE includes an anomaly detection data identification device 30. The anomaly detection data identification device 30 includes a CPU 32, a ROM 34, a memory 36, and a communication device 38, which are capable of communicating with each other through a network 42. The anomaly detection data identification device 30 analyzes the anomaly detection data received by the communication device 38 through the network 50 and outputs the result to a base 60.

The base 60 may be, for example, a vehicle development base, or a vehicle repair base. The base 60 includes a communication device 62, an interface 64, and a display 66, which are capable of communicating with each other through a network 68. When the communication device 62 of the base 60 receives the analysis result of the anomaly detection data identification device 30, the received analysis result is output to the display 66.

Figure 4:
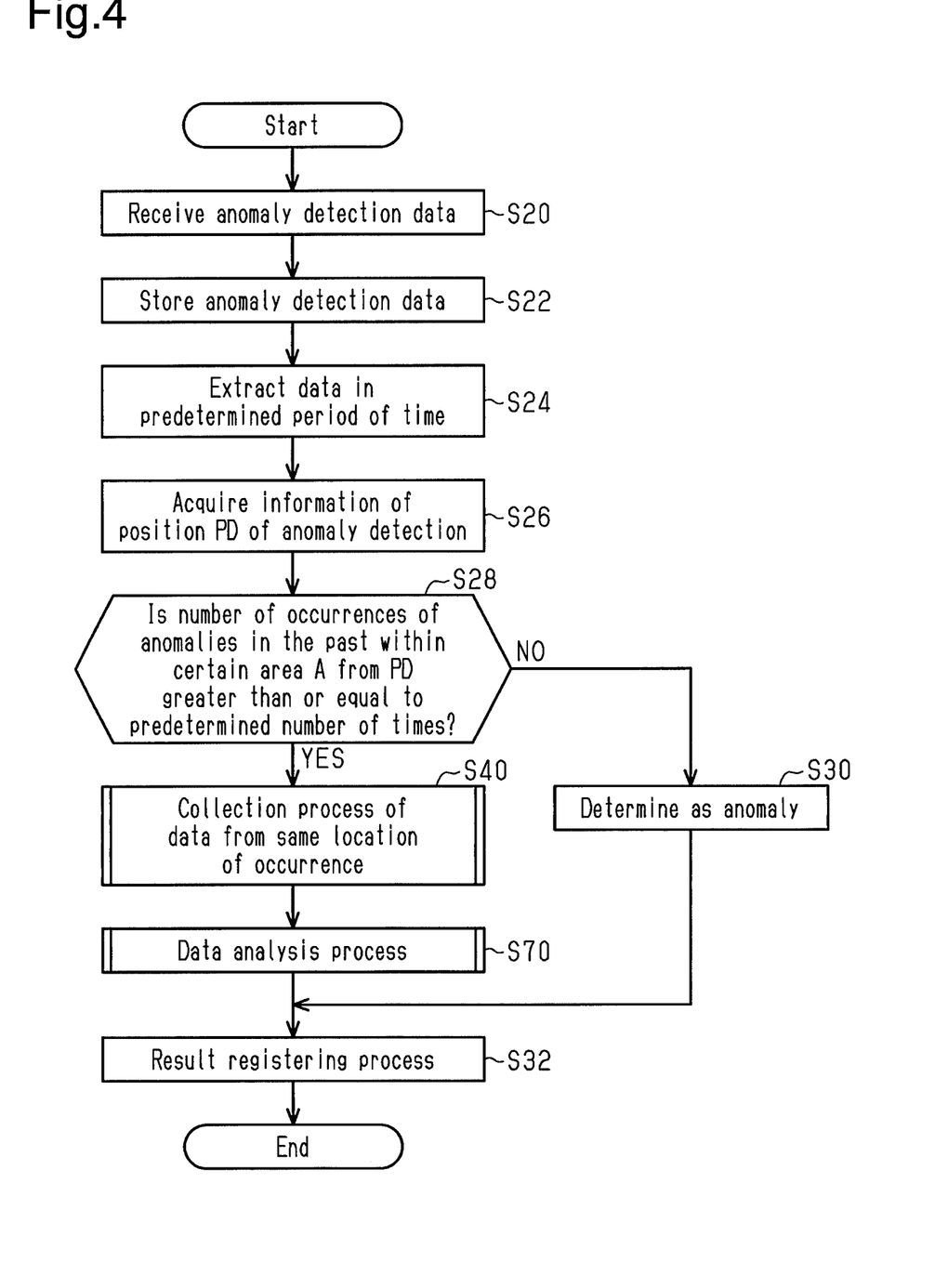
FIG. 4 is a flowchart showing the routine performed at the center according to the anomaly identification system of FIG. 1.

FIG. 4 shows the routine executed by the anomaly detection data identification device 30. The routine shown in FIG. 4 is performed by the CPU 32 executing a program stored in the ROM 34.

In the series of steps shown in FIG. 4, the CPU 32 first receives the anomaly detection data through the communication device 38 (S20). The CPU 32 sets the additionally received anomaly detection data in the current cycle as the subject of determination and determines whether it is generated due to repair at the repair shop through the following processes shown in FIG. 4. Subsequently, the CPU 32 stores the received anomaly detection data in the memory 36 (S22). Subsequently, the CPU 32 extracts the anomaly detection data during a predetermined period of time from the present point in time to a predetermined point in time in the past among the anomaly detection data stored in the memory 36 (S24). The process increases the reliability of the process of specifying a repair site candidate, which will be discussed below. That is, if all the anomaly detection data during a very long period of time are referenced, the repair shop may possibly be transferred, or a new repair shop may possibly be built in the middle of the period of time. In this respect, the predetermined period of time is set to a length that is assumed to have a sufficiently low possibility of such transfer of the repair shop or building of a new repair shop. With this being the case, all the anomaly detection data in a certain region can be considered as the data of the period of time when the repair shop exists in the region or as the data of the period of time when the repair shop does not exist in the region by extracting the anomaly detection data during the predetermined period of time as described above. The predetermined period of time is desirably longer than a year.

Subsequently, the CPU 32 acquires the position PD from each of the pieces of the anomaly detection data extracted by the process of S24 (S26). A piece of anomaly detection data that is the subject of determination is referred to as target data, and the position PD is the information included in the target data. The CPU 32 determines whether the number of times the pieces of the anomaly detection data are output (the number of occurrences of the anomalies in the past) within a certain area A from the position PD is greater than or equal to a predetermined number of times (S28). The certain area A here refers to a region within a predetermined distance LA from the center (the position PD in this case). The predetermined number of times is set to a great value that may seem excessive for the number of times the pieces of the anomaly detection data not caused due to repair of the vehicle are output within the certain area A.

If it is determined that the number of the anomalies that occurred in the past within the certain area A from the position PD is less than the predetermined number of times (S28: NO), the CPU 32 determines that the target data is not caused due to repair of the vehicle, but is the anomaly detection data caused due to occurrence of an actual anomaly not caused due to repair of the vehicle (S30). The anomaly detection data caused due to repair includes, for example, the anomaly detection data that is output in accordance with detection of a faulty connection of a connector when an operation is performed to control traveling of the vehicle with the connector of the electronic circuit detached during repair of the vehicle.

If it is determined that the number of the anomalies that occurred in the past is greater than or equal to the predetermined number of times within the certain area A from the position PD (S28: YES), the CPU 32 collects the anomaly detection data transmitted from the same location as where the target data was generated (S40).

Figure 5:
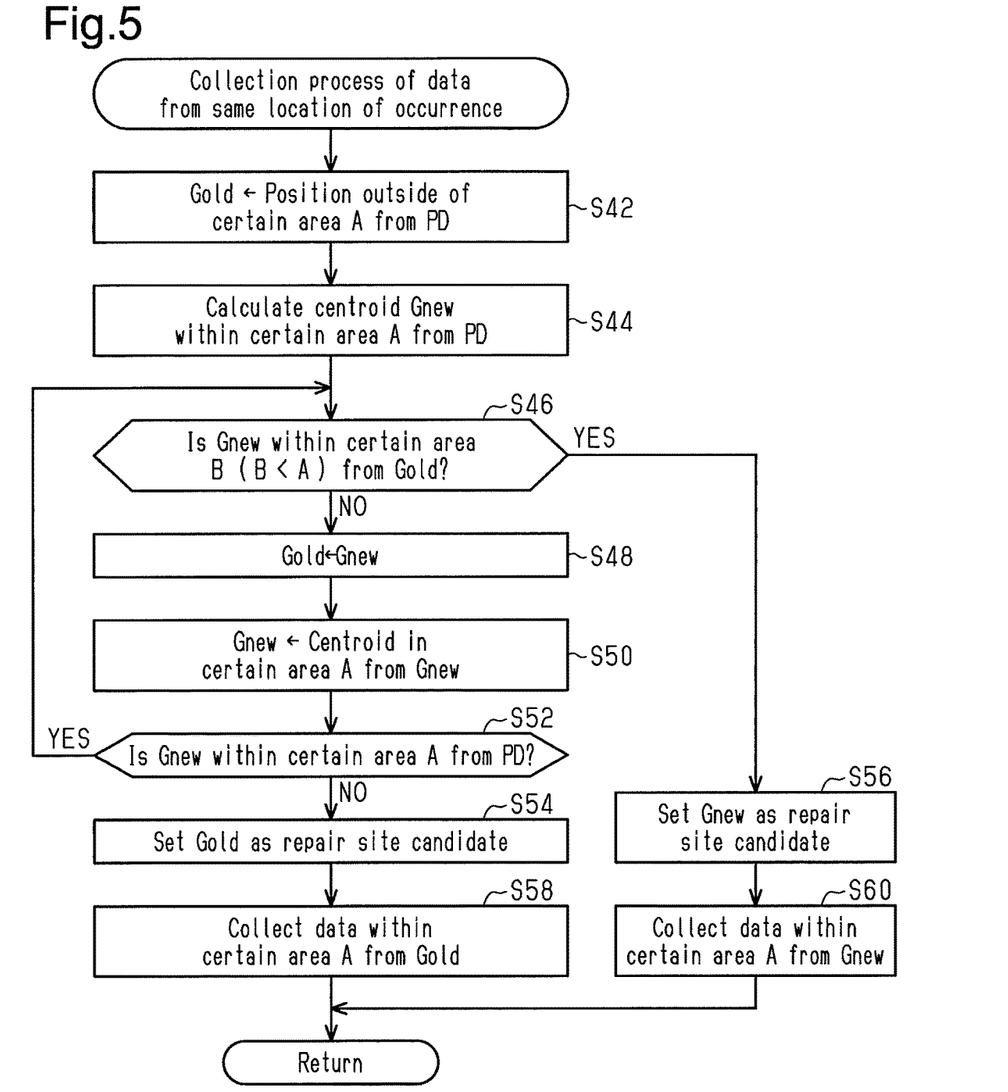
FIG. 5 is a flowchart showing the routine of a data collection process according to the anomaly identification system of FIG. 1.

FIG. 5 shows the details of the process of S40.

That is, the CPU 32 first substitutes a position that is sufficiently separate from the position PD indicated by the target data farther than the certain area A for a previous centroid Gold (S42). Subsequently, the CPU 32 calculates the centroid of the positions PD indicated by the target data and the anomaly detection data transmitted within the certain area A from the position PD indicated by the target data among the anomaly detection data extracted in the process of S24 in FIG. 4. The CPU 32 substitutes the resultant for a current centroid Gnew (S44). The centroid refers to the mean value of the positions PD indicated by the anomaly detection data. For example, assume that the two-dimensional coordinates include an x-component and a y-component. A value obtained by adding up the x-components of the positions PD and dividing the sum by the number of pieces of data will be the mean value of the x-components. A value obtained by adding up the y-components of the positions PD and dividing the sum by the number of pieces of data will be the mean value of the y-components. Note that, if multiple pieces of data indicate the same position, the components to be summed up include the same values. The thus defined centroid takes a value that is the same as the center of mass if the same particles exist at the positions PD. Subsequently, the CPU 32 determines whether the current centroid Gnew is within a certain area B from the previous centroid Gold (S46). The certain area B refers to a region within a specified distance LB, which is less than the predetermined distance LA, from the center (in this case, the previous centroid Gold). Thus, when the process of S46 is to be performed for the first time, the decision outcome of the CPU 32 will be negative due to the setting of the process of S42.

If it is determined that the current centroid Gnew is not within the certain area B from the previous centroid Gold (S46: NO), the CPU 32 substitutes the current centroid Gnew for the previous centroid Gold (S48). Subsequently, the CPU 32 calculates the centroid of the positions PD indicated by the anomaly detection data transmitted from the positions within the certain area A from the current centroid Gnew and substitutes the resultant for the current centroid Gnew (S50).

Figure 6:
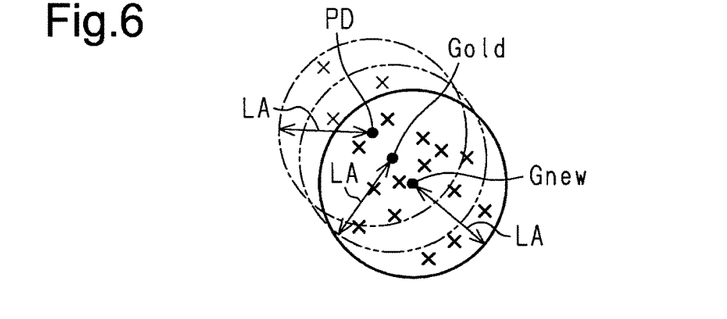
FIG. 6 is a diagram showing a calculation example of the centroid according to the anomaly identification system of FIG. 1.

FIG. 6 shows the previous centroid Gold and the current centroid Gnew at this point in time. FIG. 6 assumes that the target data is generated due to repair at the repair shop and, in particular, shows a case in which there is an error in the positions PD indicated by the anomaly detection data due to, for example, the accuracy of the GPS 18. That is, since there is an error in the positions PD indicated by the anomaly detection data, the positions PD indicated by the anomaly detection data generated due to repair at the repair shop vary significantly.

In particular, FIG. 6 shows an example in which the position PD indicated by the target data (denoted with PD in FIG. 6) is located at the periphery of the distribution of the positions PD indicated by the previously received anomaly detection data (denoted only with crosses (x marks) and not PD in FIG. 6). Thus, the previous centroid Gold determined by the process of S48 and the current centroid Gnew determined by the process of S50 are closer to the center of the distribution than the position PD.

Referring back to FIG. 5, the CPU 32 determines whether the current centroid Gnew exists within the certain area A from the position PD indicated by the target data (S52). The process determines whether the current centroid Gnew is a position appropriate for the source of the target data. If it is determined that the current centroid Gnew does not exist within the certain area A (S52: NO), the CPU 32 sets the previous centroid Gold as the repair site candidate, which is the source of the target data (S54).

That is, if the current centroid Gnew does not exist within the certain area A from the position PD indicated by the target data, it is considered that the current centroid Gnew may be actually separate from the source of the target data. Thus, the previous centroid Gold is used instead of the current centroid Gnew.

Referring back to FIG. 5, if it is determined that the current centroid Gnew exists within the certain area A (S52: YES), the CPU 32 returns to the process of S46. If it is determined that the current centroid Gnew does not exist within the certain area B from the previous centroid Gold (S46: NO), the CPU 32 updates the previous centroid Gold and the current centroid Gnew through the processes of S48 and S50.

If it is determined that the current centroid Gnew exists within the certain area B from the previous centroid Gold (S46: YES), the CPU 32 sets the current centroid Gnew as the repair site candidate, which is the source of the target data (S56). That is, if the current centroid Gnew is within the certain area B from the previous centroid Gold, it is considered that the calculation result does not change greatly any further but is converging even if the previous centroid Gold and the current centroid Gnew are updated through the processes of S48 and S50. Thus, the current centroid Gnew is set as the repair site candidate, which is the source of the target data.

When the process of S54 is completed, the CPU 32 collects the anomaly detection data within the certain area A from the previous centroid Gold, which serves as the repair site candidate, among the anomaly detection data extracted in the process of S24 (S58). In contrast, when the process of S56 is completed, the CPU 32 collects the anomaly detection data within the certain area A from the current centroid Gnew, which serves as the repair site candidate, among the anomaly detection data extracted in the process of S24 (S60).

When the process of S58 or S60 is completed, the CPU 32 completes the process of S40 in FIG. 4. Subsequently, as shown in FIG. 4, the CPU 32 executes the data analysis process based on the collected data (S70).

Figure 7:
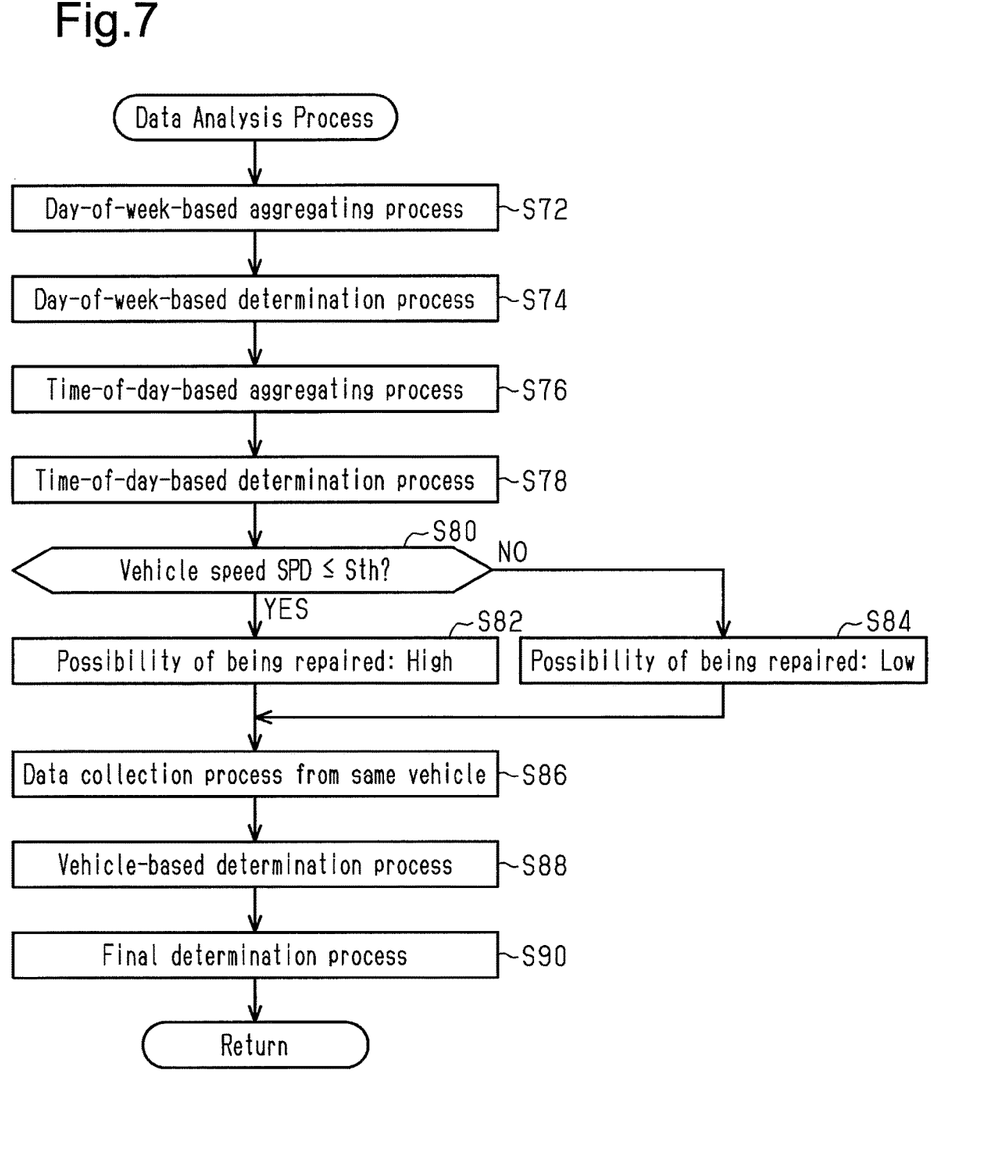
FIG. 7 is a flowchart showing the routine of a data analysis process according to the anomaly identification system of FIG. 1.

FIG. 7 shows the routine of the data analysis process.

In the series of steps shown in FIG. 7, the CPU 32 aggregates the anomaly detection data collected by the process of S40 by day of week based on the information about the day of week carried by each of the pieces of the anomaly detection data (S72). The CPU 32 determines the possibility that the target data is generated due to repair based on the aggregate result (S74).

Figure 8:
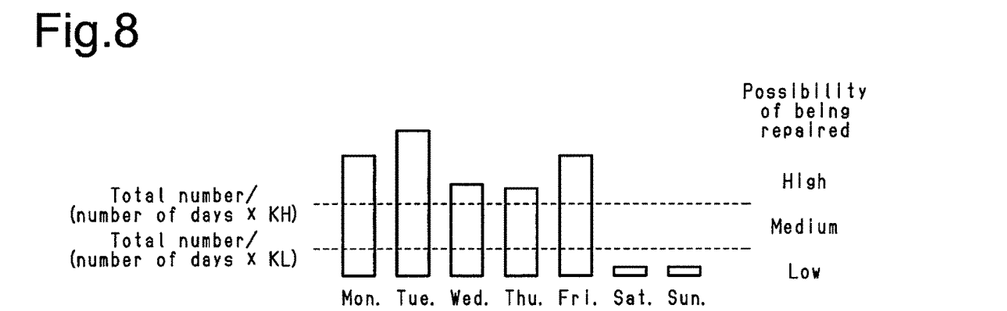
FIG. 8 is a diagram showing a day-of-week-based aggregating process according to the anomaly identification system of FIG. 1.

FIG. 8 shows the day-of-week-based aggregate result. In the example shown in FIG. 8, the number of pieces of data through Monday to Friday is greater than the number of pieces of data on Saturday and Sunday. This is because the example corresponds to the aggregate result of a case in which workers come to the repair shop through Monday to Friday. That is, if the proportion of the anomaly detection data of a day to the total number of pieces of the collected anomaly detection data is greater than or equal to a predetermined number, it is considered that the possibility that the anomaly detection data is generated due to repair at the repair shop is high. Thus, in the present embodiment, as shown in FIG. 8, if the number of pieces of the anomaly detection data on a day is less than a value obtained by dividing the total number of pieces of the anomaly detection data collected by the process of S40 by the number of days and a first division value KL, the CPU 32 determines that the possibility that the vehicle is being repaired on that day is low. If the number of pieces of the anomaly detection data on a day is greater than or equal to a value obtained by dividing the total number of pieces of the anomaly detection data collected by the process of S40 by the number of days and a second division value KH, which is smaller than the first division value KL, the CPU 32 determines that the possibility that the vehicle is being repaired on that day is high.

In the example shown in FIG. 8, the CPU 32 determines that the possibility that the vehicle is being repaired is high through Monday to Friday since the number of pieces of the anomaly detection data is greater than or equal to the value obtained by dividing the total number of pieces of the anomaly detection data collected by the process of S40 by the number of days and the second division value KH. Furthermore, the CPU 32 determines that the possibility that the vehicle is being repaired is low on Saturday and Sunday since the number of pieces of the anomaly detection data is less than the value obtained by dividing the total number of pieces of the anomaly detection data collected by the process of S40 by the number of days and the first division value KL. Although the example shown in FIG. 8 does not include an applicable case, if the number of pieces of the anomaly detection data is greater than or equal to the value obtained by dividing the total number of pieces of the anomaly detection data collected by the process of S40 by the number of days and the first division value KL and is less than the value obtained by dividing the total number by the number of days and the second division value KH, the CPU 32 determines that the possibility that the vehicle is being repaired is medium.

As described above, in the case of the data illustrated in FIG. 8, if the day indicated by the piece of anomaly detection data, which serves as the subject of determination, is Monday, the CPU 32 determines that the possibility that the vehicle is being repaired is high, and if the indicated day is Sunday, the CPU 32 determines that the possibility that the vehicle is being repaired is low.

Referring back to FIG. 7, the CPU 32 aggregates the anomaly detection data collected by the process of S40 by time of day based on the information of the time period carried by each of the pieces of the anomaly detection data (S76). The CPU 32 subsequently determines the possibility that the target data is generated due to repair based on the aggregate result (S78).

Figure 9:
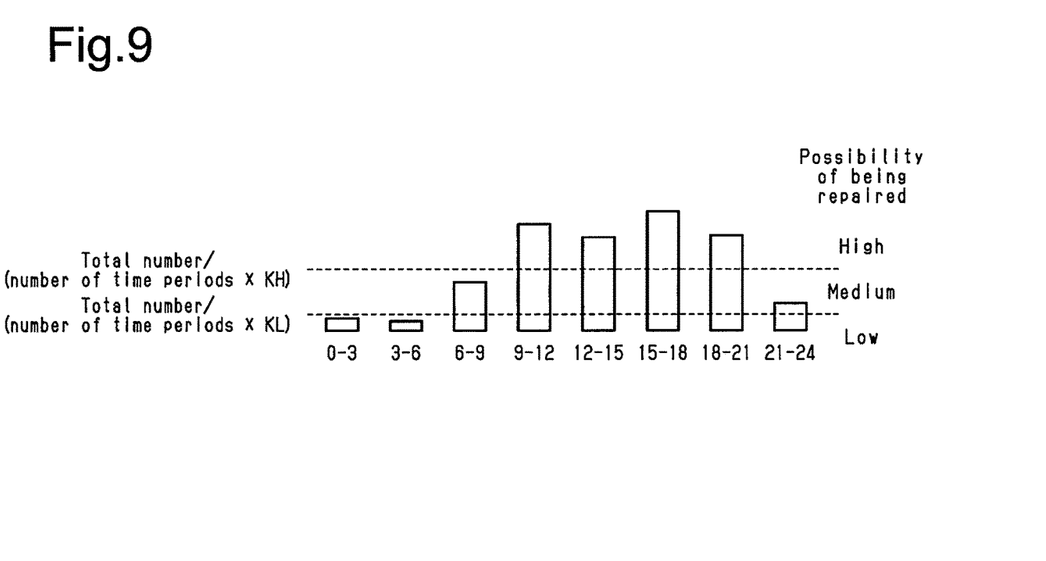
FIG. 9 is a diagram showing a time-of-day-based aggregating process according to the anomaly identification system of FIG. 1.

FIG. 9 shows the time-of-day-based aggregating process. In the example shown in FIG. 9, the number of pieces of data from 9 to 21 o'clock is larger than the number of pieces of data at other times of day. This is because the example corresponds to the aggregate result of a case in which the workers at the repair shop work (repair) from 9 to 21 o'clock. That is, if the proportion of the anomaly detection data in a time period to the total number of pieces of the collected anomaly detection data is greater than or equal to a predetermined number, it is considered that the possibility that the anomaly detection data of that time period is generated due to repair at the repair shop is high. Thus, in the present embodiment, as shown in FIG. 9, if the number of pieces of the anomaly detection data in a time period is less than a value obtained by dividing the total number of pieces of the anomaly detection data collected by the process of S40 by the number of divisions of 24 hours (in this embodiment, eight three-hour periods) and the first division value KL, the CPU 32 determines that the possibility that the vehicle is being repaired in that time period is low. If the number of pieces of the anomaly detection data in a time period is greater than or equal to a value obtained by dividing the total number of pieces of the anomaly detection data collected by the process of S40 by the number of time periods and a second division value KH, which is smaller than the first division value KL, the CPU 32 determines that the possibility that the vehicle is being repaired is high. If the number of pieces of the anomaly detection data in a time period is greater than or equal to the value obtained by dividing the total number of pieces of the anomaly detection data collected by the process of S40 by the number of time periods and the first division value KL and is less than the value obtained by dividing the total number of pieces of the anomaly detection data by the number of time periods and the second division value KH, the CPU 32 determines that the possibility that the vehicle is being repaired in that time period is medium.

In the example shown in FIG. 9, if the time period indicated by the target data corresponds to the time period through 6 to 9 o'clock, the CPU 32 determines that the possibility that the vehicle is being repaired is medium, and if the time period indicated by the anomaly detection data corresponds to the time period through 9 to 12 o'clock, the CPU 32 determines that the possibility that the vehicle is being repaired is high.

Referring back to FIG. 7, the CPU 32 determines whether the vehicle speed SPD indicated by the target data is less than or equal to a specified speed Sth (S80). The process determines whether the vehicle is stopped when the anomaly indicated by the target data is caused, and the specified speed Sth is set to a value close to zero. If it is determined that the vehicle speed SPD is less than or equal to the specified speed Sth (S80: YES), the CPU 32 determines that the possibility that the vehicle is being repaired is high (S82), and if it is determined that the vehicle speed SPD is greater than the specified speed Sth (S80: NO), the CPU 32 determines that the possibility that the vehicle is being repaired (or that the work is underway) is low (S84).

If the process of S82 or S84 is completed, the CPU 32 collects the anomaly detection data including the vehicle ID that is the same as the vehicle ID of the target data from the anomaly detection data collected by the process of S40 (S86). Subsequently, the CPU 32 determines the possibility that the vehicle is being repaired based on the number of pieces of the collected anomaly detection data (S88).

Figure 10:
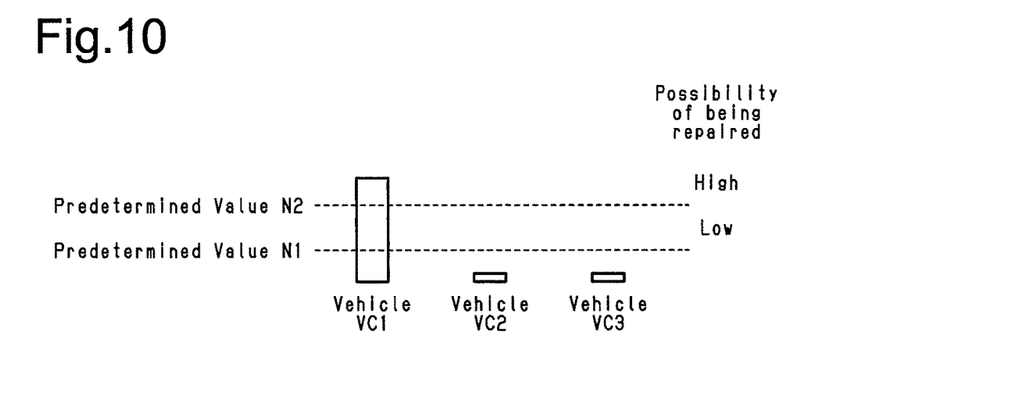
FIG. 10 is a diagram showing a vehicle-based aggregating process according to the anomaly identification system of FIG. 1.

That is, as shown in FIG. 10, in the present embodiment, the CPU 32 determines the possibility that the vehicle is being repaired based on the comparison between the number of pieces of the anomaly detection data including the vehicle ID that is the same as the vehicle ID indicated by the target data and a predetermined value N1 and the comparison with a predetermined value N2, which is greater than the predetermined value N1. More specifically, if the number of pieces of the anomaly detection data is less than the predetermined value N1, the CPU 32 determines that the possibility that the vehicle is being repaired is low. If the number of pieces of the anomaly detection data is greater than or equal to the predetermined value N2, the CPU 32 determines that the possibility that the vehicle is being repaired is high.

Furthermore, if the number of pieces of the anomaly detection data is greater than or equal to the predetermined value N1 and is less than the predetermined value N2, the CPU 32 determines that the possibility that the vehicle is being repaired is medium. In the example shown in FIG. 10, the number of pieces of the anomaly detection data of the vehicle VC1 is greater than the predetermined value N2. Thus, if the vehicle ID indicated by the target data is equal to the vehicle VC1, it is determined that the possibility that the vehicle is being repaired is high. In contrast, if the vehicle ID indicated by the target data is equal to the vehicle VC2, it is determined that the possibility that the vehicle is being repaired is low since the number of pieces of the anomaly detection data is less than the predetermined value N1. The process of S88 is performed considering the fact that there may be a certain number of users who modify or repair the vehicle by themselves. That is, if the anomaly detection data is output when a user modifies the vehicle, it is also determined that the possibility that the vehicle is being repaired at the repair shop is high. With this configuration, even if the anomaly detection data is output due to the modification, it is possible to determine that the possibility that the anomaly is the one that should be noticed is low.

Figure 11:
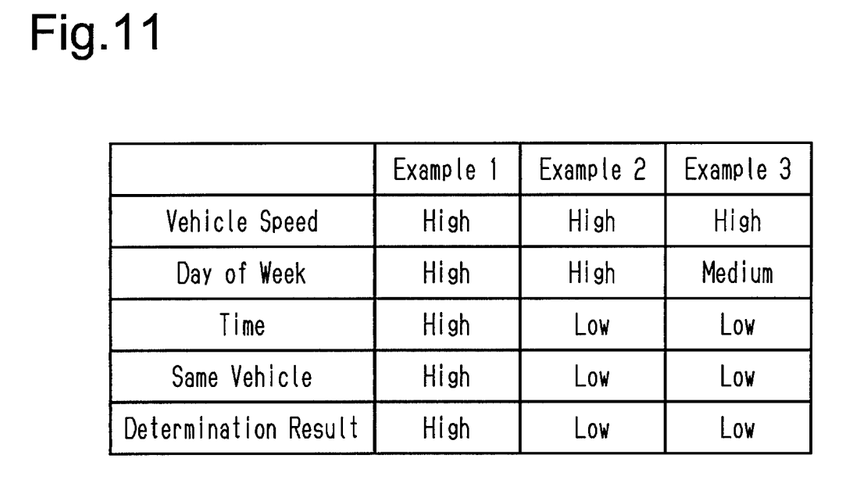
FIG. 11 is a table showing the final determination process according to the anomaly identification system of FIG. 1.

Referring back to FIG. 7, the CPU 32 executes the final determination process of the possibility that the vehicle is being repaired based on the processes of S74, S78, S82, S84, and S88 (S90). In this embodiment, as shown in FIG. 11, among the determination results of the determination processes, the lowest possibility is determined as the final determination result. In FIG. 11, the row of "Vehicle Speed" corresponds to the determination result of the processes of S80 and S84, and the row of "Day of Week" corresponds to the determination result of the process of S74. The row of "Time" corresponds to the determination result of the process of S78, and the row of "Same Vehicle" corresponds to the determination result of the process of S88. The row of "Determination Result" corresponds to the final determination result of the process of S90.

Referring back to FIG. 7, if the process of S90 is completed, the CPU 32 completes the process of S70 shown in FIG. 4. If the process of S70 or S30 is completed, the CPU 32 registers the determination result in the memory 36 (S32). If the process of S32 is completed, the CPU 32 temporarily suspends the series of steps shown in FIG. 4.

The anomaly detection data identification device 30 executes the process of transmitting the data stored in the memory 36 in response to the request from the base 60 shown in FIG. 1.

Figure 12:
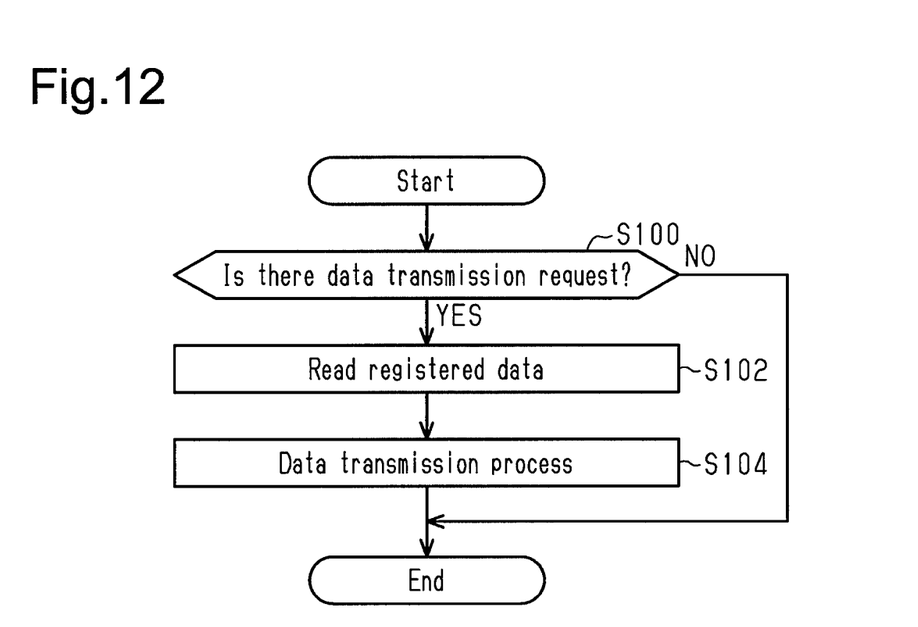
FIG. 12 is a flowchart showing the routine of a data transmission process according to the anomaly identification system of FIG. 1.

FIG. 12 shows the routine of such a process. The process shown in FIG. 12 is performed by the CPU 32 repeatedly executing the program stored in the ROM 34 in, for example, a predetermined cycle.

In the series of steps shown in FIG. 12, the CPU 32 of the anomaly detection data identification device 30 first determines whether there is a request for transmitting data from the base 60 (S100). If it is determined that there is a request for transmitting data (S100: YES), the CPU 32 reads the registered data including the anomaly detection data and the determination result of the possibility of the vehicle being repaired that is linked to the anomaly detection data from the memory 36 (S102). The CPU 32 operates the communication device 38 and transmits the read data to the base 60 through the network 50 (S104). If the process of S104 is completed, or the decision outcome of the process of S100 is negative, the CPU 32 temporarily suspends the series of steps shown in FIG. 12.

The operation and advantages of the present embodiment will now be described.

Upon receipt of a piece of anomaly detection data, the CPU 32 determines whether there is historical data that the anomaly detection data is output by a predetermined number or more in the past from the region within the certain area A from the position PD indicated by that piece of anomaly detection data. If it is determined that there is historical data, the CPU 32 specifies the repair site candidate based on the position PD. Subsequently, the CPU 32 determines the possibility that the vehicle is being repaired based on the data within the certain area A from the repair site candidate among the anomaly detection data stored in the memory 36. The determination result of the possibility that the vehicle is being repaired is linked to the piece of anomaly detection data and registered in the memory 36.

A worker at the base 60 operates the communication device 62 through the interface 64 to request transmission of the analysis result of the anomaly detection data. In response to this, the CPU 32 transmits data including the anomaly detection data and the determination result linked to the anomaly detection data to the base 60.

Thus, at the base 60, visual information of the possibility that the anomaly is caused due to repair is displayed on the display 66 together with the information of the presence of the anomaly. Thus, the worker at the base 60 can promptly determine whether the priority for analyzing the cause is low due to the high possibility that the anomaly is caused during repair.

<Correspondence>

The correspondence between the items in the illustrated embodiment and the items included in "SUMMARY" described above is as follows. The correspondence is listed below with the example number indicated in "SUMMARY".

[1] The processing circuit corresponds to the CPU 32 and the ROM 34. The receiving process corresponds to the process of S20, and the recording process corresponds to the process of S22. The determination process corresponds to the processes of S26 to S30 and S40 to S90. The predetermined area corresponds to the certain area A.

[2] The specifying process corresponds to the processes of S42 to S56. The specified area corresponds to the certain area A.

[3] The vehicle speed reflection determination process corresponds to the processes of S80 and S84.

[4] The specifying process corresponds to the processes of S42 to S56. The specified area corresponds to the certain area A.

[6] The centroid calculating process corresponds to the process of S44. The phrase "within a predetermined distance" corresponds to "within a certain area A".

[7] The second centroid calculating process corresponds to the process of S50. The first selecting process corresponds to the processes of S52 and S54. The second selecting process corresponds to the processes of S46 and S56. The specified value corresponds to the specified distance LB, which defines the certain area B.

[8] The output process corresponds to the process of S104.

[10] The computer corresponds to the CPU 32.

Other Embodiments

The present embodiment may be modified as follows. The above-described embodiment and the following modifications can be combined as long as the combined modifications remain technically consistent with each other.

Regarding Specifying Process

In the routine of FIG. 5, the current centroid Gnew calculated in the process of S44 may be specified as the repair site candidate. Alternatively, for example, the position PD itself may be set as the repair site candidate without executing the process of obtaining the centroid. In this case, it is only required to execute the process of S70 based on the anomaly detection data within the certain area A from the position PD.

Regarding Anomaly Detection Data within Specified Area Used in Process of S70.

In the above-described embodiment, among the anomaly detection data extracted by the process of S24, the data with the position PD in the specified area from the repair site candidate, which is the certain area A, is used in the process of S70. However, the configuration is not limited to this. For example, the specified area may be different from the certain area A and may be narrower than the certain area A used in the calculation of the centroid.

Furthermore, the data used in the process of S70 does not necessarily have to be the anomaly detection data extracted by the process of S24, but may be, for example, the data with the position PD in the specified area from the repair site candidate among all the anomaly detection data stored in the memory 36. In this case, for example, a process may be added that deletes the data within the predetermined region if the anomaly detection data is not additionally generated for a specified time within the predetermined region.

Regarding Time-of-Day-Based Aggregating Process and Time-of-Day-Based Determination Process In the above-described embodiment, the time of day does not necessarily have to be distinguished by three-hour periods, but may be distinguished by, for example, two-hour periods or six-hour periods.

Furthermore, the possibility that the vehicle is being repaired does not necessarily have to be determined in three levels. For example, the maximum value may be set to 100%, and the minimum value may be set to 0%. The possibility that the vehicle is being repaired may be determined in 101 levels in a range of 0 to 100. This is achieved by, for example, using 100 different threshold values instead of the first division value KL and the second division value KH.

Regarding Vehicle Speed Reflection Determination Process

In the above-described embodiment, the specified speed Sth does not necessarily have to be set to a value for determining whether the vehicle is stopped. Furthermore, the determination process does not necessarily have to make a binary decision of whether the possibility that the vehicle is being repaired is high or low in accordance with the vehicle speed SPD. For example, the determination process may make a ternary decision. In this case, for example, considering the fact that the possibility that the vehicle is being repaired is low during high-speed travelling, it is only required to determine that the possibility that the vehicle is being repaired is low in a low-speed region, lower in a medium-speed region, and the lowest in a high-speed region.

Regarding Day-of-Week-Based Aggregating Process and Day-of-Week-Based Determination Process In the above-described embodiment, the days do not necessarily have to be distinguished as Monday, Tuesday, Wednesday, Thursday, Friday, Saturday, and Sunday. For example, the days may be distinguished as the weekdays (Monday, Tuesday, Wednesday, Thursday, and Friday) and the weekend (Saturday and Sunday). However, in this case, a value obtained by dividing the total number of pieces of the collected anomaly detection data by 5 and the first division value KL or the second division value KH is used for the comparison on the weekdays, and a value obtained by dividing the total number of pieces of the collected anomaly detection data by 2 and the first division value KL or the second division value KH is used for the comparison on the weekend.

The possibility that the vehicle is being repaired does not necessarily have to be determined in three levels. For example, the maximum value may be set to 100%, and the minimum value may be set to 0%. The possibility that the vehicle is being repaired may be determined in 101 levels in a range of 0 to 100. This is achieved by, for example, using 100 different threshold values instead of the first division value KL and the second division value KH.

Regarding Determination Process

In the above-described embodiment, the maximum values of the possibility that the vehicle is being repaired are set to the same value, and the minimum values of the possibility that the vehicle is being repaired are set to the same value in the determination results obtained by the day-of-week-based determination process, the time-of-day-based determination process, the process of S80 to S84, and the vehicle-based determination process. However, the configuration is not limited to this. For example, the possibility that the vehicle is being repaired may be medium or low in the determination result of the vehicle-based determination process. That is, the maximum value of the possibility that the vehicle is being repaired obtained through the vehicle-based determination process may be smaller than the maximum value of the possibility that the vehicle is being repaired in the determination results obtained through the day-of-week-based determination process, the time-of-day-based determination process, and the process of S80 to S84.

In the above-described embodiment, among the determination results obtained through the day-of-week-based determination process, the time-of-day-based determination process, the process of S80 to S84, and the vehicle-based determination process, the result that is determined to have the lowest possibility that the vehicle is being repaired is used. However, the configuration is not limited to this. For example, the determination results obtained through the determination processes may be converted into numbers, and the mean value of the numbers may be set as the final determination result.

In the above-described embodiment, the final determination does not necessarily have to be made based on the determination results obtained through the day-of-week-based determination process, the time-of-day-based determination process, the process of S80 to S84, and the vehicle-based determination process. For example, the final determination may be made based on only three, two, or one of the four processes including the day-of-week-based determination process, the time-of-day-based determination process, the process of S80 to S84, and the vehicle-based determination process.

Alternatively, for example, if the decision outcome of the process of S28 is positive, the possibility that the vehicle is being repaired may be determined to be high without executing the processes of S40 and S70.

In the above-described embodiment, if the decision outcome of the process of S28 is negative, it is concluded that the vehicle is not being repaired. However, the configuration is not limited to this. For example, it may be determined that the possibility that the vehicle is being repaired is low.

Regarding Anomaly Detection Data Identifying Device

In the above described embodiment, the base 60 is the location of the worker who carries out an analysis using the anomaly detection data. The anomaly detection data identification device 30 does not necessarily have to be located at the center CE different from the base 60, but may be located at the base 60.

Furthermore, for example, the memory 36 does not necessarily have to be located at the same place as the CPU 32 and the ROM 34, which configure the processing circuit. For example, the memory 36 may be located at the center CE, and the processing circuit may be located at the center CE and the base 60. The processes S20 and S22 among the processes of FIG. 4 may be executed at the center CE, and the remaining processes of FIG. 4 may be executed at the base 60.

Regarding Processing Circuit

The processing circuit is not limited to a device that includes the CPU 32 and the ROM 34 and executes software processing. For example, at least part of the processes executed by the software in the above-described embodiments may be executed by hardware circuits dedicated to execution of these processes (such as ASIC). That is, the processing circuit may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided.

The invention claimed is:

1. An anomaly detection data identification device configured to receive anomaly detection data from a vehicle-mounted anomaly notification device, the anomaly detection data identification device comprising:
a processing circuit and a memory, the processing circuit being configured to:
receive the anomaly detection data from the vehicle-mounted anomaly notification device, the anomaly detection data including a number of pieces of information that include target data,
store the received anomaly detection data in the memory,
determine whether a degree of probability possibility that the target data in the received anomaly detection data is generated due to repair of the vehicle is greater or less than a predetermined occurrence threshold,
acquire a position of the vehicle when the anomaly occurred based on the target data, and
when an anomaly is detected, output anomaly detection data including the position of a vehicle and information indicating a presence of the anomaly, wherein:
the number of pieces of the anomaly detection data is defined as the number of pieces of the anomaly detection data output within a predetermined area from the position of the vehicle when the anomaly occurred is acquired based on the target data among the anomaly detection data stored in the memory, and the degree of probability that the target data is generated due to repair of the vehicle is: (i) greater than the predetermined occurrence threshold when the number of pieces of the anomaly detection data is greater than or equal to a predetermined number in the predetermined area from the position of the vehicle, and (ii) less than the predetermined occurrence threshold when the number of pieces of the anomaly detection data is less than the predetermined number in the predetermined area from the position of the vehicle.

2. The anomaly detection data identification device according to claim 1, wherein
the anomaly detection data includes information about time at which an anomaly occurred, and
the processing circuit is configured to:
specify a repair site candidate based on the target data,
aggregate a number of occurrences of the anomaly by time periods based on the anomaly detection data output within a specified area from the repair site candidate among the anomaly detection data stored in the memory, the number of occurrences of the anomaly being defined as the number of occurrences of the anomaly that corresponds to a time indicated by the target data among the categorized time periods, and
determine that the possibility that the target data is generated due to repair of the vehicle is higher when the number of occurrences of the anomaly is greater than a predetermined value.

3. The anomaly detection data identification device according to claim 2, wherein
the processing circuit is configured to:
calculate a centroid based on positions included within a predetermined distance from the position of the vehicle identified by the target data among positions of the vehicle identified by past anomaly detection data stored in the memory, the centroid being a mean value of the positions, and
specify the repair site candidate based on the calculated centroid.

4. The anomaly detection data identification device according to claim 3, wherein
the calculation of the centroid includes:
setting the calculated centroid as an initial value of a first centroid,
calculating a second centroid based on the positions included within the predetermined distance from the first centroid among the positions of the vehicle identified by the anomaly detection data of the past stored in the memory, the second centroid being a mean value of the positions of the vehicle,
selecting the first centroid as the repair site candidate if-when a distance between the position of the vehicle identified by the target data and the second centroid is greater than a threshold value, and
selecting the second centroid as the repair site candidate when a distance between the position of the vehicle identified by the target data and the second centroid is less than or equal to the threshold value, and a distance between the first centroid and the second centroid is less than or equal to a specified value, and
when a distance between the first centroid and the second centroid is greater than the specified value, the processing circuit substitutes the second centroid for the first centroid and executes the calculates another second centroid.

5. The anomaly detection data identification device according to claim 1, wherein
the anomaly detection data includes information about a vehicle speed when the anomaly occurred, and
the processing circuit is configured to:
determine that the possibility that the target data is generated due to repair of the vehicle is higher when the vehicle speed is small than when the vehicle speed is great.

6. The anomaly detection data identification device according to claim 1, wherein
the anomaly detection data includes information about the a day of week on which the anomaly occurred, and
the processing circuit is configured to:
specify a repair site candidate based on the target data,
aggregate a number of occurrences of the anomaly by day of week based on the anomaly detection data output within a specified area from the repair site candidate among the anomaly detection data stored in the memory, and
determine that the possibility that the target data is generated due to repair of the vehicle is higher when the number of occurrences of the anomaly is greater than a predetermined value on the day corresponding to the day indicated by the target data among the categories of the day.

7. The anomaly detection data identification device according to claim 1, wherein
the anomaly detection data includes information that identifies the vehicle, and
the processing circuit is configured to:
aggregate a number of occurrences of anomaly of the same vehicle based on the anomaly detection data stored in the memory, and
determine that the possibility that the anomaly detection data is generated due to repair of the vehicle is higher when the number of occurrences of the anomaly of the same vehicle as the vehicle identified by the target data is greater than a predetermined value.

8. The anomaly detection data identification device according to claim 1, wherein
the processing circuit is configured to
output, in on a display, data that links information indicating the occurrence of the anomaly based on the anomaly detection data and a determination result of the determination process corresponding to the information.

9. An anomaly identification system comprising:
a vehicle-mounted anomaly notification device configured to anomaly is detected, output anomaly detection data including a position of a vehicle and information indicating an occurrence of the anomaly when an anomaly is detected, and
an anomaly detection data identification device is-configured to receive the anomaly detection data from the vehicle-mounted anomaly notification device, the anomaly detection data identification device including a processing circuit and a memory, the processing circuit being configured to:
receive the anomaly detection data from the vehicle-mounted anomaly notification device, the anomaly detection data including a number of pieces of information that include target data,
store the received anomaly detection data in the memory,
determine whether a degree of probability that the target data in the received anomaly detection data is generated due to repair of the vehicle is greater or less than a predetermined occurrence-threshold, acquire a position of the vehicle when the anomaly occurred based on the target data, and when an anomaly is detected, output anomaly detection data including the position of a vehicle and information indicating a presence of the anomaly, wherein:

the number of pieces of the anomaly detection data is defined as the number of pieces of the anomaly detection data output within a predetermined area from the position of the vehicle when the anomaly occurred is acquired based on the target data among the anomaly detection data stored in the memory, and the degree of probability that the target data is generated due to repair of the vehicle is: (i) greater than the predetermined occurrence threshold when the number of pieces of the anomaly detection data is greater than or equal to a predetermined number in the predetermined area from the position of the vehicle, and (ii) less than the predetermined occurrence threshold when the number of pieces of the anomaly detection data is less than the predetermined number in the predetermined area from the position of the vehicle.

10. An anomaly detection data identification method performed by an anomaly detection data identification device, the identification method being performed by a processing circuit of the anomaly detection data identification device, the method comprising:

receiving anomaly detection data from a vehicle-mounted anomaly notification device, the anomaly detection data being output from the vehicle-mounted anomaly notification device when an anomaly is detected, the anomaly detection data including: (a) a position of a vehicle, (b) information indicating an occurrence of the anomaly, and (c) a number of pieces of information that include target data;

storing the received anomaly detection data in a memory;

determining whether a degree of probability that the target data in the received anomaly detection data is generated due to repair of the vehicle is greater or less than a predetermined occurrence-threshold;

acquiring a position of the vehicle when the anomaly occurred based on the target data; and when an anomaly is detected, outputting anomaly detection data including the position of a vehicle and information indicating a presence of the anomaly, wherein:

the number of pieces of the anomaly detection data is defined as the number of pieces of the anomaly detection data output within a predetermined area from the position of the vehicle when the anomaly occurred is acquired based on the target data among the anomaly detection data stored in the memory, and the degree of probability that the target data is generated due to repair of the vehicle is: (i) greater than the predetermined occurrence threshold when the number of pieces of the anomaly detection data is greater than or equal to a predetermined number in the predetermined area from the position of the vehicle, and (ii) less than the predetermined occurrence threshold when the number of pieces of the anomaly detection data is less than the predetermined number in the predetermined area from the position of the vehicle.

11. A non-transitory computer-readable memory medium storing a program causing a processing circuit to execute steps comprising:

receiving anomaly detection data from a vehicle-mounted anomaly notification device, the anomaly detection data being output from the vehicle-mounted anomaly notification device when an anomaly is detected, the anomaly detection data including: (a) a position of a vehicle, (b) information indicating an occurrence of the anomaly, and (c) a number of pieces of information that include target data, storing the received anomaly detection data in a memory, determining whether a degree of probability that the target data in the received anomaly detection data is generated due to repair of the vehicle is greater or less than a predetermined occurrence-threshold, acquiring a position of the vehicle when the anomaly occurred based on the target data, and when an anomaly is detected, outputting anomaly detection data including the position of a vehicle and information indicating a presence of the anomaly, wherein:

the number of pieces of the anomaly detection data is defined as the number of pieces of the anomaly detection data output within a predetermined area from the position of the vehicle when the anomaly occurred is acquired based on the target data among the anomaly detection data stored in the memory, and the degree of probability that the target data is generated due to repair of the vehicle is: (i) greater than the predetermined occurrence threshold when the number of pieces of the anomaly detection data is greater than or equal to a predetermined number in the predetermined area from the position of the vehicle, and (ii) less than the predetermined occurrence threshold when the number of pieces of the anomaly detection data is less than the predetermined number in the predetermined area from the position of the vehicle.

* * * * *